United States Patent
Kudo et al.

(10) Patent No.: US 11,503,254 B2
(45) Date of Patent: Nov. 15, 2022

(54) IMAGE GENERATION APPARATUS AND IMAGE GENERATION METHOD

(71) Applicant: SEIKO EPSON CORPORATION, Tokyo (JP)

(72) Inventors: Kei Kudo, Shiojiri (JP); Teruyuki Nishimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/334,120

(22) Filed: May 28, 2021

(65) Prior Publication Data

US 2021/0385419 A1  Dec. 9, 2021

(30) Foreign Application Priority Data

Jun. 5, 2020 (JP) .............................. JP2020-098281

(51) Int. Cl.
*H04N 9/04* (2006.01)
*H04N 9/083* (2006.01)

(52) U.S. Cl.
CPC ......... *H04N 9/04557* (2018.08); *H04N 9/083* (2013.01)

(58) Field of Classification Search
CPC ..... H04N 9/04557; H04N 9/083; G01J 3/027; G01J 3/2823; G01J 3/26; G01J 3/0205; G01J 3/12; G01J 2003/1204; G01J 2003/2826; G01N 21/31; G01N 21/01; G01N 21/17; G01N 2021/0112; G01N 2021/1776

See application file for complete search history.

(56) References Cited

U.S. PATENT DOCUMENTS

| | | | |
|---|---|---|---|
| 2015/0185074 A1* | 7/2015 | Zhao | G01J 3/32 356/326 |
| 2015/0211927 A1* | 7/2015 | Tatsuda | G01J 3/28 356/326 |
| 2015/0241279 A1 | 8/2015 | Funamoto | |
| 2016/0037141 A1* | 2/2016 | Matsushita | G01J 3/0256 348/273 |

(Continued)

FOREIGN PATENT DOCUMENTS

JP  2015161512 A  9/2015

*Primary Examiner* — Shahbaz Nazrul
(74) *Attorney, Agent, or Firm* — Chip Law Group

(57) ABSTRACT

An image generation apparatus includes: a spectroscopic filter switching a wavelength of transmitted image light depending on a change in distance between a pair of reflective films; an imaging element imaging the image light transmitted through the spectroscopic filter; and one or more processors, which switches the wavelength of the transmitted light to a plurality of wavelengths in forward scanning to narrow the distance between the reflective films and backward scanning to widen the distance between the reflective films, switches the wavelength of the transmitted light to wavelengths of red, green, and blue colors in the forward scanning and the backward scanning, synthesizing a color image by synthesizing spectroscopic images of the red, green, and blue colors obtained in the forward scanning performed once, and generating a color image by synthesizing spectroscopic images of the red, green, and blue colors obtained in the backward scanning performed once.

5 Claims, 7 Drawing Sheets

(56) References Cited

U.S. PATENT DOCUMENTS

2016/0061661 A1* 3/2016 Nishimura ................ G01J 3/26
356/456
2022/0090966 A1* 3/2022 Kudo ........................ G01J 3/26

* cited by examiner

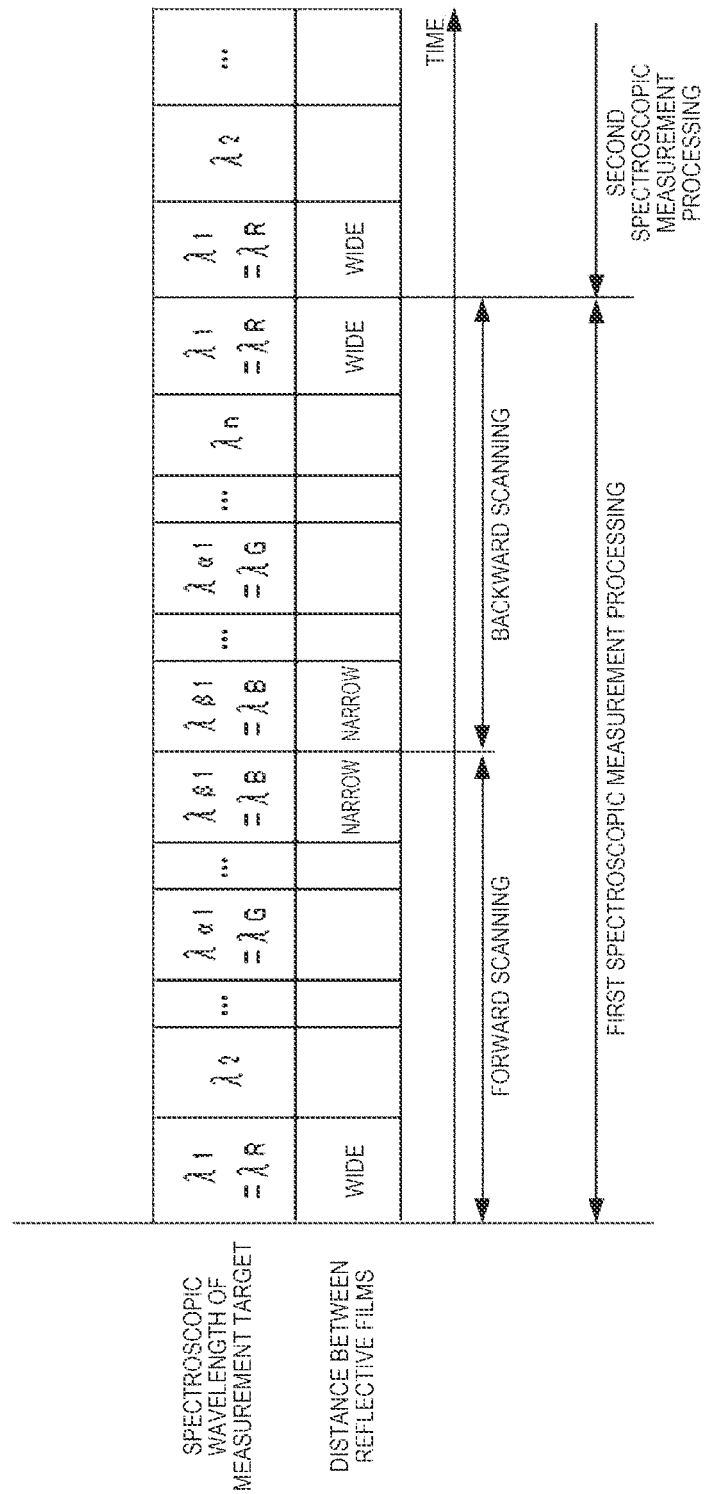

IMAGE GENERATION APPARATUS AND IMAGE GENERATION METHOD

The present application is based on, and claims priority from JP Application Serial Number 2020-098281, filed Jun. 5, 2020, the disclosure of which is hereby incorporated by reference herein in its entirety.

BACKGROUND

1. Technical Field

The present disclosure relates to an image generation apparatus and an image generation method.

2. Related Art

In the related art, there are spectroscopic cameras configured to capture spectroscopic images of targets to be imaged, which cause displays to display color images of the targets to be imaged in real time to check the targets to be imaged, for example. However, if cameras for capturing color images are incorporated in the spectroscopic cameras to display the color images, configurations become complicated, and costs also increase. Thus, image generation apparatuses configured to generate color images to be displayed in real time using spectroscopic images captured by spectroscopic cameras are known (see JP-A-2015-161512, for example).

The image generation apparatus described in JP-A-2015-161512 has a pair of reflective films as spectroscopic filters and uses a Fabry-Perot etalon element capable of changing a transmission wavelength by changing the distance between the reflective films to image light transmitted through the spectroscopic filters using an imaging element. Also, a plurality of spectroscopic wavelengths that are allowed to be transmitted through the spectroscopic filters are categorized into wavelengths included in a red color wavelength range, wavelengths included in a green color wavelength range, and wavelengths included in a blue color wavelength range. Further, one wavelength is selected from each of the red color wavelength range, the green color wavelength range, and the blue color wavelength range to make one group, and a plurality of groups including mutually different wavelengths are set.

Then, one wavelength of the red color wavelength range, one wavelength of the green color wavelength range, and one wavelength of the blue color wavelength range included in one group are selected in order to image spectroscopic images when the distance between the reflective films is changed from the maximum distance to the minimum distance, and the imaged spectroscopic images of the respective colors are synthesized to generate a real time image. Next, the distance between the reflective films is returned to the maximum distance, and spectroscopic images corresponding to the next group are captured.

However, according to the image generation apparatus and the image generation method described in JP-A-2015-161512, the spectroscopic images in the red color wavelength range, the green color wavelength range, and the blue color wavelength range are captured in order when the distance between the reflective films of the spectroscopic filters is changed from the maximum distance to the minimum distance, and the distance between the reflective films is then returned to the maximum distance again. During the period of time when the distance between the reflective films is returned to the maximum distance, the spectroscopic images are not captured. Therefore, there is a time until the next spectroscopic images are captured, and update intervals of the real time image, that is, a frame rate is also degraded, which is problematic.

SUMMARY

An image generation apparatus according to a first aspect of the present disclosure includes: a spectroscopic filter that includes a pair of reflective films and causes image light with a predetermined wavelength to be selectively emitted from incident image light by changing a distance between the pair of reflective films; an imaging element that captures the image light that is transmitted through the spectroscopic filter; and one or more processors, in which the one or more processors are configured to execute switching a wavelength of the image light that is to be transmitted through the spectroscopic filter to a plurality of wavelengths for spectral measurement in each of forward scanning in which the distance between the pair of reflective films is changed from a predetermined maximum dimension to a minimum dimension and backward scanning in which the distance is changed from the minimum dimension to the maximum dimension, and switching the wavelength that is transmitted through the spectroscopic filter to a predetermined red color wavelength belonging to a red color wavelength range, a predetermined green color wavelength belonging to a green color wavelength range, and a predetermined blue color wavelength belonging to a blue color wavelength range in each of the forward scanning and the backward scanning, and generating a color image by synthesizing spectroscopic images obtained by imaging the image light with each of the red color wavelength, the green color wavelength, and the blue color wavelength obtained in the forward scanning performed once, and generating a color image by synthesizing spectroscopic images obtained by imaging the image light with each of the red color wavelength, the green color wavelength, and the blue color wavelength obtained in the backward scanning performed once.

An image generation apparatus according to a second aspect of the present disclosure includes: a spectroscopic filter that includes a pair of reflective films and causes image light with a predetermined wavelength to be selectively emitted from incident image light by changing a distance between the pair of reflective films; an imaging element that captures the image light that is transmitted through the spectroscopic filter; and one or more processors, in which the one or more processors are configured to execute switching a wavelength of the image light that is to be transmitted through the spectroscopic filter to a plurality of wavelengths for spectral measurement in each of forward scanning in which the distance between the pair of reflective films is changed from a predetermined maximum dimension to a minimum dimension and backward scanning in which the distance is changed from the minimum dimension to the maximum dimension, switching the wavelength that is to be transmitted through the spectroscopic filter to a predetermined green color wavelength belonging to a green color wavelength range in each of the forward scanning and the backward scanning, and switching at least once of the wavelength that is to be transmitted through the spectroscopic filter to a predetermined red color wavelength belonging to a red color wavelength range and a predetermined blue color wavelength belonging to a blue color wavelength range through either the forward scanning or the backward scanning, and generating a color image by synthesizing a spectroscopic image obtained by imaging the image light with the green color wavelength obtained in the forward scanning and a spectroscopic image obtained by imaging the image light with each of the red color wavelength and the blue color wavelength obtained in the forward scanning or the backward scanning that is continuous with the forward scanning, and generating a color image by synthesizing a spectroscopic image obtained by imaging the image light with the green color wavelength obtained in the backward scanning and a spectroscopic image obtained by imaging the image light with each of the red color wavelength and the blue color wavelength obtained in the backward scanning or the forward scanning that is continuous with the backward scanning.

An image generation method according to a third aspect of the present disclosure is performed by an image generation apparatus including a spectroscopic filter that includes a pair of reflective films and causes image light with a predetermined wavelength to be selectively emitted from incident image light by changing a distance between the pair of reflective films and an imaging element that captures the image light that is transmitted through the spectroscopic filter, and the method includes: obtaining a captured image by capturing the image light with each wavelength by switching a wavelength of the image light that is to be transmitted through the spectroscopic filter to a plurality of wavelengths for spectral measurement in each of forward scanning in which the distance between the pair of reflective films is changed from a predetermined maximum dimension to a minimum dimension and backward scanning in which the distance is changed from the minimum dimension to the maximum dimension, and switching the wavelength that is to be transmitted through the spectroscopic filter to a predetermined red color wavelength belonging to a red color wavelength range, a predetermined green color wavelength belonging to a green color wavelength range, and a predetermined blue color wavelength belonging to a blue color wavelength range in each of the forward scanning and the backward scanning; and generating a color image by synthesizing spectroscopic images obtained by imaging the image light with each of the red color wavelength, the green color wavelength, and the blue color wavelength obtained in the forward scanning performed once, and generating a color image by synthesizing spectroscopic images obtained by imaging the image light with each of the red color wavelength, the green color wavelength, and the blue color wavelength obtained in the backward scanning performed once.

An image generation method according to a fourth aspect of the present disclosure is performed by an image generation apparatus including a spectroscopic filter that includes a pair of reflective films and causes image light with a predetermined wavelength to be selectively emitted from incident image light by changing a distance between the pair of reflective films and an imaging element that captures the image light that is transmitted through the spectroscopic filter, and the method includes: obtaining a captured image by capturing the image light with each wavelength by switching a wavelength of the image light that is to be transmitted through the spectroscopic filter to a plurality of wavelengths for spectral measurement in each of forward scanning in which the distance between the pair of reflective films is changed from a predetermined maximum dimension to a minimum dimension and backward scanning in which the distance is changed from the minimum dimension to the maximum dimension, switching the wavelength that is to be transmitted through the spectroscopic filter to a predetermined green color wavelength belonging to a green color wavelength range in each of the forward scanning and the backward scanning, and switching at least once the wavelength that is to be transmitted through the spectroscopic filter to a predetermined red color wavelength belonging to a red color wavelength range and a predetermined blue color wavelength belonging to a blue color wavelength range through either the forward scanning or the backward scanning, and generating a color image by synthesizing a spectroscopic image obtained by imaging the image light with the green color wavelength obtained in the forward scanning and a spectroscopic image obtained by imaging the image light with each of the red color wavelength and the blue color wavelength obtained in the forward scanning or the backward scanning that is continuous with the forward scanning, and generating a color image by synthesizing a spectroscopic image obtained by imaging the image light with the green color wavelength obtained in the backward scanning and a spectroscopic image obtained by imaging the image light with each of the red color wavelength and the blue color wavelength obtained in the backward scanning or the forward scanning that is continuous with the backward scanning.

BRIEF DESCRIPTION OF THE DRAWINGS

FIG. 7 is a diagram illustrating an example of an acquisition order of a spectroscopic image for measurement and a spectroscopic image for synthesis according to a Modification Example 2.

DESCRIPTION OF EXEMPLARY EMBODIMENTS

First Embodiment

Hereinafter, a first embodiment will be described.

Figure 1:
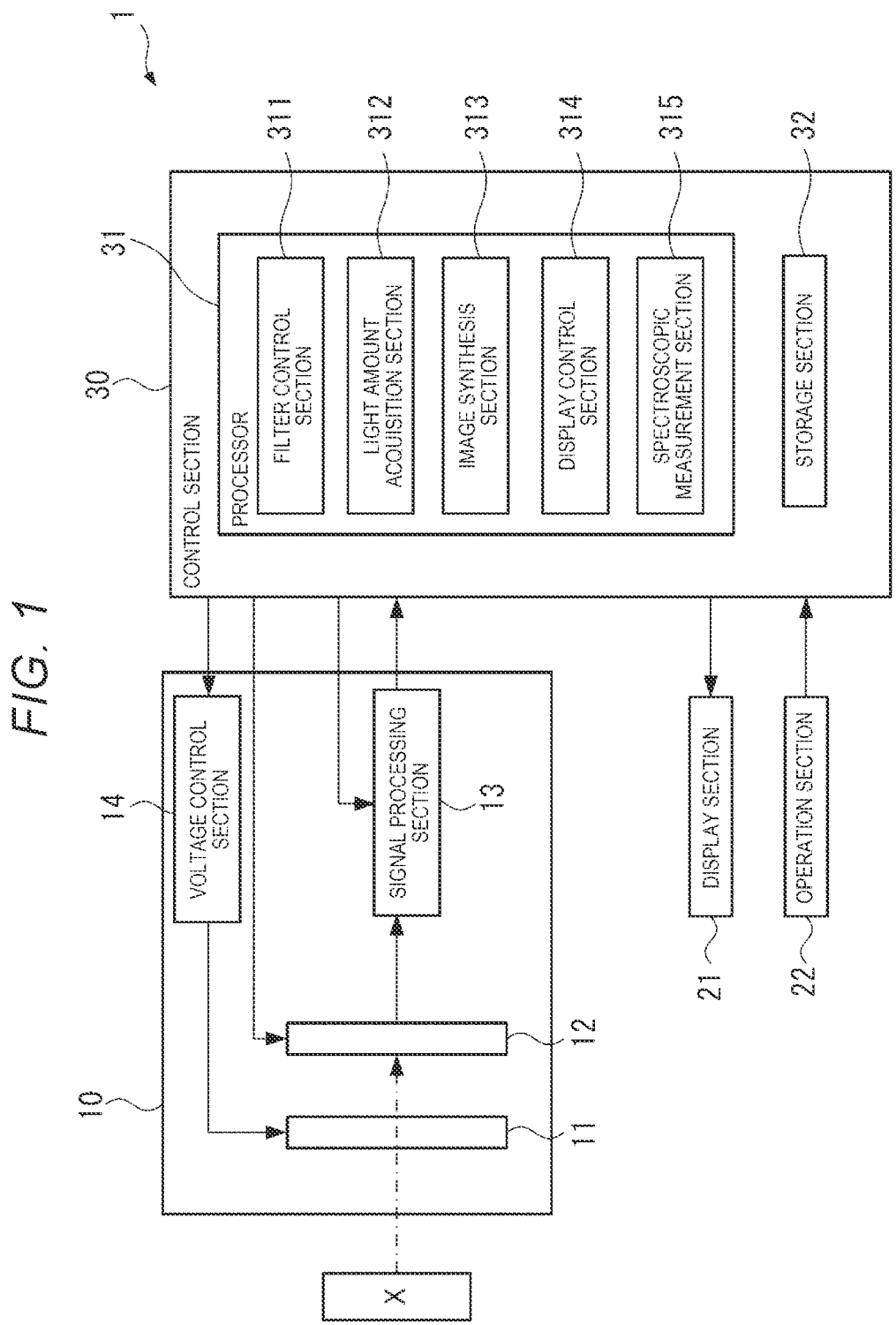
FIG. 1 is a block diagram illustrating an overview configuration of a spectroscopic measurement apparatus according to a first embodiment.

FIG. 1 is a block diagram illustrating an overview configuration of a spectroscopic measurement apparatus according to the present embodiment.

A spectroscopic measurement apparatus 1 corresponds to an image generation apparatus according to the present disclosure and is an apparatus that analyzes light intensity with each wavelength in a measurement target light reflected by a measurement target object X and measures a spectroscopic spectrum. As illustrated in FIG. 1, the spectroscopic measurement apparatus 1 includes an optical module 10, a display section 21, an operation section 22, and a control section 30 that controls the optical module 10 and the display section 21 and processes a signal output from the optical module 10.

The optical module 10 according to the present embodiment is a so-called spectroscopic camera that captures a spectroscopic image of the measurement target object X. The spectroscopic measurement apparatus 1 synthesizes a color image from a spectroscopic image captured by the optical module 10 and causes the display section 21 to display the color image in real time when the spectroscopic measurement of the measurement target object X is performed. In this manner, an operator of the spectroscopic measurement apparatus 1 can determine relative positions of the spectroscopic measurement apparatus 1 and the measurement target object X with reference to the color image (hereinafter, also referred to as a real time image). Further, in regard to the real time image, the spectroscopic measurement apparatus 1 may cause the display section 21 to display a spectroscopic image with a predetermined wavelength captured by the optical module 10 in a superimposed manner on the real time image or may cause the display section 21 to display an analysis result of analysis based on spectroscopic images with a plurality of wavelengths in a superimposed manner on the real time image.

Hereinafter, each configuration of such a spectroscopic measurement apparatus 1 will be described in detail.

Configuration of Optical Module

The optical module 10 includes an interference filter 11 that is a spectroscopic filter, an imaging element 12, a signal processing section 13, and a voltage control section 14.

The optical module 10 causes image light reflected by the measurement target object X to be incident on the interference filter 11 through an incident optical system, which is not illustrated. The image light that is transmitted through the incident optical system and is then incident on the interference filter 11 is the incident image light according to the present disclosure, and the image light that has been transmitted through the interference filter 11 is received by the imaging element 12. If the image light is received by the imaging element 12, then an image signal of a spectroscopic image in accordance with the received image light is output to the control section 30 via the signal processing section 13.

Configuration of Interference Filter 11

Figure 2:
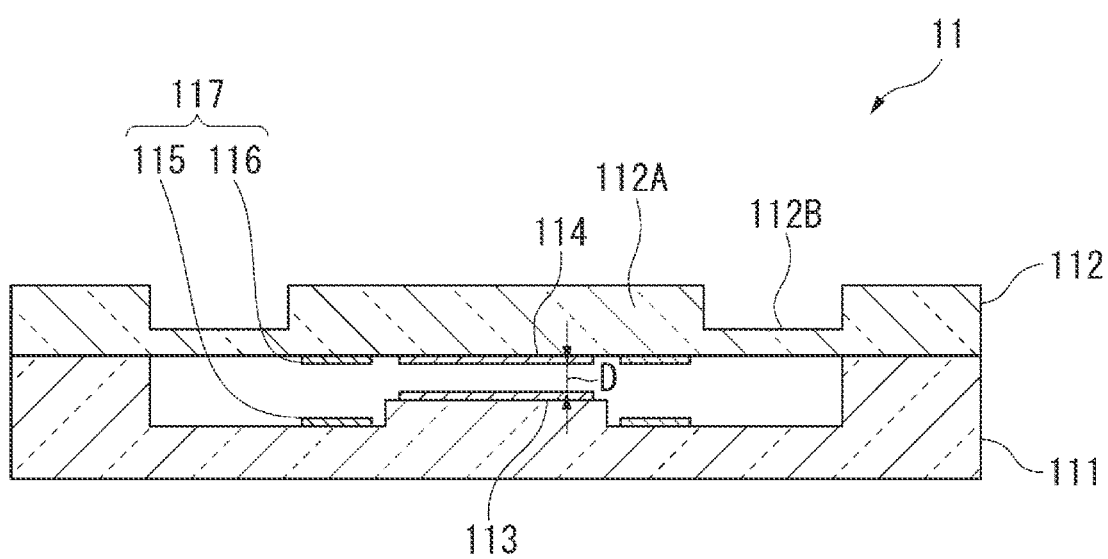
FIG. 2 is a sectional view illustrating an overview configuration of an interference filter according to the first embodiment.

FIG. 2 is a sectional view illustrating an overview configuration of the interference filter 11.

The interference filter 11 corresponds to the spectroscopic filter according to the present disclosure and is a Fabry-Perot etalon element of a wavelength variable type.

The interference filter 11 includes a light transmissive first substrate 111 and a second substrate 112. The first substrate 111 and the second substrate 112 are joined with a joining film such as a plasma polymerized film containing siloxane as a main component, for example, and are integrally configured.

A first reflective film 113 configuring one of a pair of reflective films is provided on the surface of the first substrate 111 facing the second substrate 112. The first reflective film 113 may be made of a metal film or a metal alloy film or may be made of a dielectric multilayer film. Also, when the first reflective film 113 is made of a dielectric multilayer film, a first capacitance electrode made of a transparent electrode such as ITO may be formed on the surface thereof. When the first reflective film 113 is made of a conductive film such as a metal film or a metal alloy film, the first reflective film 113 itself can be caused to function as an electrode.

A first electrode 115 is provided on the surface of the first substrate 111 facing the second substrate 112. The first electrode 115 is disposed to surround the outer periphery of the first reflective film 113, for example, and faces a second electrode 116 provided on the second substrate 112.

The second substrate 112 includes an annular recessed groove formed in the surface thereof on the opposite side of the first substrate 111 and includes a movable section 112A corresponding to the inside of the annular recessed groove and a diaphragm section 112B corresponding to the bottom surface of the recessed groove.

A second reflective film 114 configuring the other one of the pair of reflective films is provided on the surface of the movable section 112A facing the first substrate 111. The second reflective film 114 faces the first reflective film 113 provided on the first substrate 111 with a gap D interposed therebetween. The second reflective film 114 is made of a material similar to that of the first reflective film 113 and is made, for example, of a metal film, a metal alloy film, or a dielectric multilayer film. Further, when the second reflective film 114 is made of a dielectric multilayer film, a second capacitance electrode made of a transparent electrode such as ITO may be formed on the surface thereof. When the second reflective film 114 is made of a conductive film such as a metal film or a metal alloy film, the second reflective film 114 itself can be caused to function as an electrode.

Also, a second electrode 116 is provided on the surface of at least any one of the movable section 112A and the diaphragm section 112B of the second substrate 112 facing the first electrode 115. The second electrode 116 configures an electrostatic actuator 117 along with the first electrode 115.

According to the interference filter 11 as described above, the movable section 112A is displaced on the side of the first substrate 111 due to electrostatic force, and the dimension (gap dimension) of the gap D between the first reflective film 113 and the second reflective film 114 changes, by a voltage being applied to the first electrode 115 and the second electrode 116 of the electrostatic actuator 117. It is thus possible to change the wavelength of the light that is to be transmitted through the interference filter 11.

Although the interference filter 11 is configured to include one electrostatic actuator 117 in FIG. 2, the configuration is not limited thereto. For example, the interference filter 11 may be configured to include an inner electrostatic actuator disposed to surround the outside of the first reflective film 113 and the second reflective film 114 and an outer electrostatic actuator provided outside the inner electrostatic actuator. In this case, it is possible to achieve a configuration in which the movable section 112A is roughly controlled through application of a bias voltage to any one of the inner electrostatic actuator and the outer electrostatic actuator and the movable section is finely controlled through application of a control voltage to the other one of them.

Configurations of Imaging Element 12, Signal Processing Section 13, and Voltage Control Section 14

Next, returning to FIG. 1, another configuration of the optical module 10 will be described.

The imaging element 12 receives light that has been transmitted through the interference filter 11 and outputs an image signal based on the amount of received light to the signal processing section 13. The imaging element 12 includes a plurality of pixels aligned in a matrix shape along two axes that perpendicularly intersect each other, for example, and outputs a signal in accordance with the amount of received light from each of the pixels. As such imaging elements 12, it is possible to use various image sensors such as a charge-coupled device (CCD) or a complementary metal-oxide semiconductor (CMOS), for example.

The signal processing section 13 amplifies an image signal that is an analog signal input from the imaging element 12, then converts the image signal into a digital signal, and outputs the digital signal to the control section 30. The signal processing section 13 includes an amplifier that amplifies a detection signal, an A/D converter that converts an analog signal into a digital signal, and the like.

The voltage control section 14 applies a drive voltage to the electrostatic actuator 117 of the interference filter 11 based on control performed by the control section 30. In this manner, an electrostatic attraction force is generated between the first electrode 115 and the second electrode 116 of the electrostatic actuator 117, and the movable section 112A is displaced on the side of the first substrate 111.

Configurations of Display Section 21 and Operation Section 22

The display section 21 is, for example, various displays such as a liquid panel display or an organic EL display. The display section 21 displays a real time image and the like based on control performed by the control section 30.

The operation section 22 includes, for example, various devices capable of detecting user's operations, such as a mouse and a keyboard. As the operation section 22, a touch panel of a type integrated with the display section 21 may be used.

Configuration of Control Section 30

Next, the control section 30 of the spectroscopic measurement apparatus 1 will be described.

The control section 30 includes a combination of a central processing unit (CPU) and a memory, for example, and controls overall operations of the spectroscopic measurement apparatus 1. As illustrated in FIG. 1, the control section 30 includes a processor 31 and a storage section 32.

The storage section 32 stores various programs and various kinds of data for controlling the spectroscopic measurement apparatus 1. The data is, for example, V-A data indicating the wavelength of transmitted light with respect to the drive voltage to be applied to the electrostatic actuator 117 and information related to a spectroscopic wavelength when the measurement target object X is measured, and for example, an order of switching the spectroscopic wavelengths.

The processor 31 functions as a filter control section 311, a light amount acquisition section 312, an image synthesis section 313, a display control section 314, and a spectroscopic measurement section 315 by reading and executing the programs stored in the storage section 32.

The filter control section 311 sets a target wavelength of light to be extracted by the interference filter 11 and outputs, to the voltage control section 14, a command signal indicating that a drive voltage corresponding to the set target wavelength is to be applied to the electrostatic actuator 117 based on the V-A data. Although details will be described later, the filter control section 311 performs forward scanning for changing the dimension of the gap D of the interference filter 11 from the maximum dimension to the minimum dimension and backward scanning for changing the dimension from the minimum dimension to the maximum dimension. Here, the maximum dimension may be an initial dimension of the gap D in a state in which no voltage is applied to the electrostatic actuator 117 or may be a dimension corresponding to the maximum wavelength among spectroscopic wavelengths that are targets of imaging. Further, the minimum dimension may be a dimension when the applicable maximum voltage is applied to the electrostatic actuator 117 or may be a dimension corresponding to the minimum wavelength among spectroscopic wavelengths that are targets of imaging.

Then, the filter control section 311 sets the dimension of the gap D to a dimension corresponding to the plurality of wavelengths in order during the forward scanning and similarly sets the dimension of the gap D to a dimension corresponding to the plurality of wavelengths during the backward scanning. In the present embodiment, the wavelengths set in the forward scanning include at least a predetermined red color wavelength (700 nm, for example: hereinafter, referred to as a specific R wavelength) in a red color wavelength range, a predetermined green color wavelength (560 nm, for example; hereinafter, referred to as a specific G wavelength) in a green color wavelength range, and a predetermined blue color wavelength (400 nm, for example; hereinafter, referred to as a specific B wavelength) in a blue color wavelength range. Similarly, the wavelengths set during the backward scanning include at least the specific B wavelength, the specific G wavelength, and the specific R wavelength. Wavelengths other than the specific R wavelength, the specific G wavelength, and the specific B wavelength are spectroscopic wavelengths for spectral measurement.

The light amount acquisition section 312 controls the imaging element 12 and acquires an image signal output from the imaging element 12 via the signal processing section 13. In other words, the light amount acquisition section 312 acquires a spectroscopic image based on the amount of the received light at each pixel of the imaging element 12. The acquired spectroscopic image is associated with the spectroscopic wavelength of the light that is transmitted through the interference filter 11 and is stored in the storage section 32. The storage section 32 may store information regarding the amount of received light corresponding to each pixel, such as information on a voltage value or the like of a detection signal, for example, in association with a measurement wavelengths instead of the image data of the spectroscopic image itself. In other words, spectral information, which is the amount of received light with respect to the wavelength, may be recorded for each pixel.

The image synthesis section 313 generates a color image by synthesizing spectroscopic images with respect to the specific R wavelength, the specific G wavelength, and the specific B wavelength. In the present embodiment, spectroscopic images with respect to the specific R wavelength, the specific G wavelength, and the specific B wavelength are acquired in forward scanning performed once, and spectroscopic images with respect to the specific R wavelength, the specific G wavelength, and the specific B wavelength are acquired through backward scanning performed once. Therefore, the image synthesis section 313 synthesizes the color images every time the forward scanning is performed and every time the backward scanning is performed.

The display control section 314 causes the display section 21 to display the color images synthesized by the image synthesis section 313 as a real time image. In the present embodiment, the color images are synthesized every time the forward scanning is performed and every time the backward scanning is performed. Therefore, the display control section 314 can update the real time image every time the forward scanning is performed and every time the backward scanning is performed. In other words, the real time image is updated using the time related to the forward scanning and the time related to the backward scanning as a frame rate.

Also, the display control section 314 may cause the spectroscopic image with a predetermined spectroscopic wavelength to be displayed in a superimposed manner on the color image or may cause the result of spectroscopic measurement performed by the spectroscopic measurement section 315 to be displayed in a superimposed manner on the color image, based on the user's operation.

The spectroscopic measurement section 315 corresponds to a spectroscopic information output section according to the present disclosure, performs measurement processing and analysis processing based on the spectroscopic image with each spectroscopic wavelength, and outputs spectroscopic information. For example, the spectroscopic measurement section 315 measures a spectral property of the measurement target object X, performs analysis processing for analyzing the components and contents of the components contained in the measurement target object X based on the spectral property, and outputs the result of the analysis processing as spectroscopic information.

Overview of Operations of Spectroscopic Measurement Apparatus

Next, an overview of operations of the spectroscopic measurement apparatus 1 as described above will be described below based on the drawings.

The spectroscopic measurement apparatus 1 performs real time display processing of causing the display section 21 to display, as a real time image, a color image obtained by synthesizing spectroscopic images of each of the colors of the specific R wavelength, the specific G wavelength, and the specific B wavelength captured by the optical module 10.

Here, in the spectroscopic measurement apparatus 1 according to the present embodiment, the spectroscopic images of the specific R wavelength, the specific G wavelength, and the specific B wavelength are acquired a plurality of times to update a real time image during measurement of a predetermined number of wavelengths on which the spectroscopic measurement is performed when the real time display processing and the spectroscopic measurement processing are performed.

The spectroscopic measurement apparatus 1 according to the present embodiment causes the display section 21 to display an image indicating a result of spectroscopic measurement every time the spectroscopic measurement section 315 performs the spectroscopic measurement processing. When the spectroscopic measurement section 315 performs component analysis processing of the measurement target object X, for example, an analysis result image with a tone in accordance with the contents of analyzed components are displayed in a superimposed manner on locations where the components that are targets of analysis have been detected, in the color image that is a real time image.

Thus, the color image and the analysis result image are updated in real time in the present embodiment.

Figure 3:
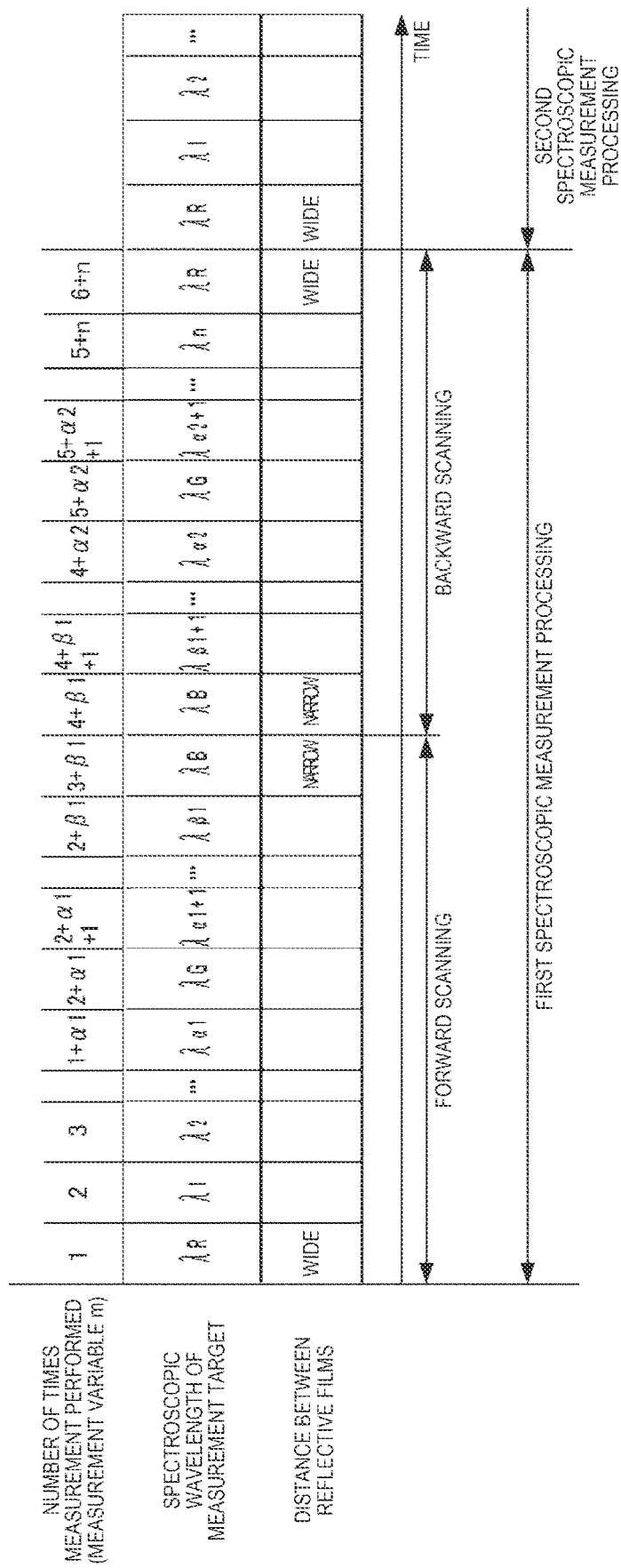
FIG. 3 is a diagram illustrating an example of an acquisition order of spectroscopic images for measurement and spectroscopic images for synthesis according to the first embodiment.

FIG. 3 is a diagram illustrating an example of an acquisition order of spectroscopic images for measurement and spectroscopic images for synthesis according to the present embodiment.

In the present embodiment, the number of spectroscopic wavelengths for spectral measurement on which the measurement is performed by the spectroscopic measurement section 315 is n, and spectroscopic images with n spectroscopic wavelengths for measurement from $\lambda_1$ to $\lambda_n$ (hereinafter, referred to as spectroscopic images for measurement) are acquired. Here, the subscript "i" of $\lambda_1$ is a variable for identifying the wavelength when a spectroscopic spectrum is measured. Each of the spectroscopic wavelengths $\lambda_1$ to $\lambda_n$ is assumed to be a different wavelength.

As illustrated in FIG. 3, the spectroscopic measurement apparatus 1 according to the present embodiment sequentially switches the light that is to be transmitted through the interference filter 11 to the n spectroscopic wavelengths $\lambda_1$ for spectral measurement between the forward scanning performed once and the backward scanning performed once and acquires spectroscopic images. For example, n/2 spectroscopic images for measurement are acquired in the forward scanning, and n/2 spectroscopic images for measurement are acquired through the remaining forward scanning.

Also, the spectroscopic measurement apparatus 1 according to the present embodiment acquires spectroscopic images (hereinafter, referred to as spectroscopic images for synthesis) for synthesizing three color images with the specific R wavelength $\lambda_R$, the specific G wavelength $\lambda_G$, and the specific B wavelength $\lambda_B$ in addition to the aforementioned n/2 spectroscopic images for spectroscopic measurement in the forward scanning. Similarly, the spectroscopic measurement apparatus 1 acquires three spectroscopic images for synthesis with the specific R wavelength $\lambda_R$, the specific G wavelength $\lambda_G$, and the specific B wavelength $\lambda_B$ in addition to the aforementioned n/2 spectroscopic images for measurement in the backward scanning.

Figure 4:
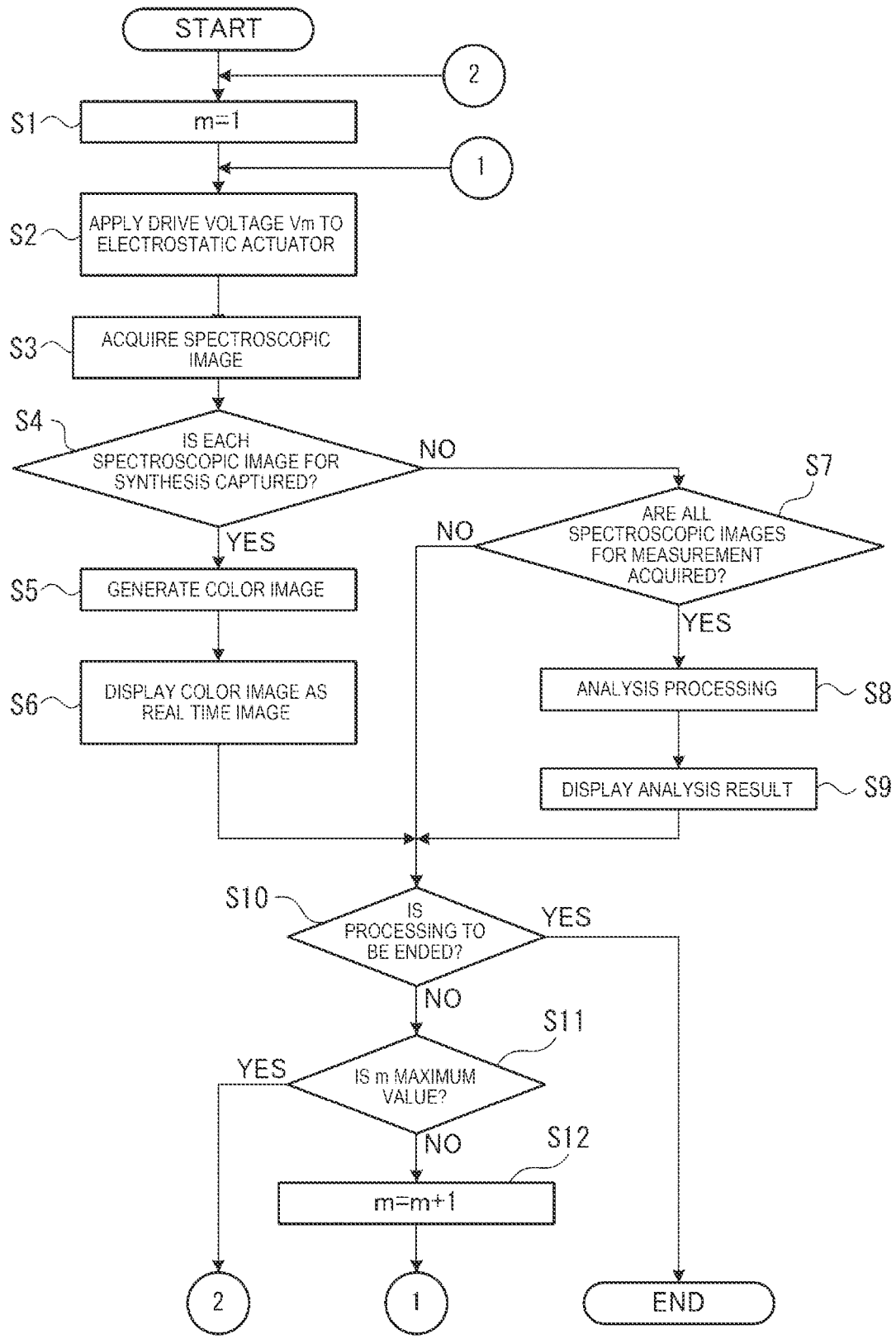
FIG. 4 is a flowchart illustrating a spectroscopic measurement method and an image generation method performed by the spectroscopic measurement apparatus according to the first embodiment.

FIG. 4 is a flowchart illustrating a spectroscopic measurement method and an image generation method performed by the spectroscopic measurement apparatus 1 according to the present embodiment.

When the spectroscopic measurement apparatus 1 causes a real time image of a color image and a measurement result as described above to be displayed, the storage section 32 stores a switching order of the spectroscopic wavelengths to be switched in the forward scanning and a switching order of the spectroscopic wavelengths to be switched in the backward scanning as illustrated in FIG. 3.

Then, if a user inputs an instruction for starting the spectroscopic measurement processing to the spectroscopic measurement apparatus 1, then the filter control section 311 initializes a measurement variable m indicating the number of times measurement has been performed and sets m=1 (Step S1).

Then, the filter control section 311 reads, from V-$\lambda$ data, a drive voltage $V_m$ corresponding to the spectroscopic wavelength that is a target of m-th measurement based on the switching order of the spectroscopic wavelengths stored in the storage section 32 and applies the drive voltage $V_m$ to the electrostatic actuator 117 (Step S2). In this manner, image light with the spectroscopic wavelength corresponding to the drive voltage $V_m$ is transmitted through the interference filter 11 and is then received by the imaging element 12.

Also, the light amount acquisition section 312 controls the imaging element 12 to cause the imaging element 12 to capture the spectroscopic image and acquires an image signal input from the imaging element 12 via the signal processing section 13, that is, the spectroscopic image (Step S3).

Thereafter, the image synthesis section 313 determines whether or not the spectroscopic images for synthesis with the specific R wavelength $\lambda_R$, the specific G wavelength $\lambda_G$, and the specific B wavelength $\lambda_B$ have been captured (Step S4). As illustrated in FIG. 3, for example, it is determined that each of spectroscopic images for synthesis with the specific R wavelength $\lambda_R$, the specific G wavelength $\lambda_G$, and the specific B wavelength $\lambda_B$ has been captured when the spectroscopic image for synthesis with the specific B wavelength $\lambda_B$ is captured in the forward scanning. In the backward scanning, it is determined that each of the spectroscopic images for synthesis with the specific R wavelength $\lambda_R$, the specific G wavelength $\lambda_G$, and the specific B wavelength $\lambda_B$ has been captured when the spectroscopic image for synthesis with the specific R wavelength $\lambda_R$ is captured.

When the determination result in Step S4 is YES, the image synthesis section 313 synthesizes the spectroscopic images of the specific R wavelength $\lambda_R$, the specific G wavelength $\lambda_G$, and the specific B wavelength $\lambda_B$ acquired immediately before to generate a color image (Step S5). Further, the display control section 314 causes the display section 21 to display the generated color image as a real time image (Step S6).

When the determination result in Step S4 is NO, the spectroscopic measurement section 315 determines whether or not all the spectroscopic images for measurement have been acquired (Step S7). In other words, whether or not n spectroscopic images with the spectroscopic wavelength $\lambda_1$ for measurement to the spectroscopic wavelength $\lambda_n$ for measurement have been imaged is determined.

When the determination result in Step S7 is YES, the spectroscopic measurement section 315 performs analysis processing using the acquired n spectroscopic images for measurement (Step S8). For example, the spectroscopic measurement section 315 calculates a spectroscopic spectrum of each pixel from each spectroscopic image and performs component analysis processing of calculating the contents of predetermined components (water, for example) contained in the measurement target object X based on the spectroscopic spectrum in the present embodiment. Then, the display control section 314 causes the analysis result in Step S8 to be displayed in a superimposed manner on the real time image displayed on the display section 21 (Step S9).

After Step S6, or after Step S9, or when the determination result in Step S7 is NO, the control section 30 determines whether or not to end the spectroscopic measurement processing (Step S10). When the user provides an input indicating that the spectroscopic measurement processing is to be ended, for example, the control section 30 determines YES in Step S10 and ends the spectroscopic measurement processing.

When the determination result in Step S10 is NO, the control section 30 determines whether or not the measurement variable m is a maximum value (6+n in the present embodiment illustrated in FIG. 3) (Step S11). When the determination result in Step S11 is NO, the filter control section 311 adds 1 to the measurement variable m (Step S12) and returns to Step S2.

On the other hand, when the determination result in Step S11 is YES, the control section 30 returns to Step S1, initializes the measurement variable m, and starts the second spectroscopic measurement processing.

The spectroscopic measurement processing as described above will be described using the example illustrated in FIG. 3.

The spectroscopic measurement apparatus 1 acquires a spectroscopic image for synthesis with the specific R wavelength $\lambda_R$ when m=1, then reducing the distance of the gap D in a stepwise manner, and acquires α1 spectroscopic images for measurement from the spectroscopic wavelength $\lambda_1$ for measurement to the spectroscopic wavelength $\lambda_{\alpha 1}$ for measurement. In the present embodiment, $\lambda_R > \lambda_1$ and $\lambda_{\alpha 1} > \lambda_G$.

Next, the spectroscopic measurement apparatus 1 acquires a spectroscopic image for synthesis with the specific G wavelength $\lambda_G$, then reduces the distance of the gap D in a stepwise manner, and acquires (β1−α1) spectroscopic images for measurement from a spectroscopic wavelength $\lambda_{\alpha 1+1}$ for measurement to a spectroscopic wavelength $\lambda_{\beta 1}$ for measurement. In the present embodiment, $\lambda_G > \lambda_{\alpha 1+1}$ and $\lambda_{\beta 1} > \lambda_B$.

Thereafter, the spectroscopic measurement apparatus 1 acquires the spectroscopic image for synthesis with the specific B wavelength $\lambda_B$.

Therefore, the determination result in Step S4 is YES if the imaging of the spectroscopic image when m=3+β1 ends during the forward scanning. In other words, the three spectroscopic images for synthesis are measured, and the real time image is updated with the synthesized color image, during the forward scanning for changing the dimension of the gap D in a narrowed direction.

The filter control section 311 performs backward scanning to change the dimension of the gap D in a widened direction after the forward scanning. A plurality of spectroscopic images are acquired even after the backward scanning as well as illustrated in FIG. 3.

Specifically, as illustrated in FIG. 3, the spectroscopic image for synthesis with the specific B wavelength $\lambda_B$ is acquired when m=4+β1 is the start time of the backward scanning, the distance of the gap D is then increased in a stepwise manner, and (α2−β1) spectroscopic images for measurement from the spectroscopic wavelength $\lambda_{\beta 1+1}$ for measurement to the spectroscopic wavelength $\lambda_{\alpha 2}$ for measurement are acquired. In the present embodiment, $\lambda_{\beta 1+1} > \lambda_B$ and $\lambda_{\alpha 2} < \lambda_G$.

Next, the spectroscopic measurement apparatus 1 acquires the spectroscopic image for synthesis with the specific G wavelength $\lambda_G$, then increases the distance of the gap D in a stepwise manner, and acquires (n−α2) spectroscopic images for measurement from the spectroscopic wavelength $\lambda_{\alpha 2+1}$ for measurement to the spectroscopic wavelength $\lambda_n$ for measurement. In the present embodiment, $\lambda_{\alpha 2+1} > \lambda_G$ and $\lambda_n < \lambda_B$.

Thereafter, the spectroscopic measurement apparatus 1 acquires the spectroscopic image for synthesis with the specific B wavelength $\lambda_B$.

Therefore, the determination result in Step S4 is YES if the imaging of the spectroscopic image when m=3+β1 ends during the forward scanning. In other words, the three spectroscopic images for synthesis are measured, and the real time image is updated with the synthesized color image, during the forward scanning for changing the dimension of the gap D in a narrowed direction.

Therefore, if the imaging of the spectroscopic image when m=6+n ends during the forward scanning, the determination result in Step S34 is YES. In other words, the three spectroscopic images for synthesis are measured, and the real time image is updated with the synthesized color image, during the forward scanning for changing the dimension of the gap D in a narrowed direction.

Although the example in FIG. 3 is an example in which the spectroscopic wavelength $\lambda_1$ for measurement and the spectroscopic wavelength $\lambda_n$ for measurement are shorter than the specific R wavelength $\lambda_R$ and the spectroscopic wavelength $\lambda_{\beta 1}$ for measurement and the spectroscopic wavelength $\lambda_{\beta 1+1}$ for measurement are longer than the specific B wavelength $\lambda_B$, the disclosure is not limited thereto. For example, the specific R wavelength $\lambda_R$ may be shorter than the spectroscopic wavelength $\lambda_1$ for measurement and the spectroscopic wavelength $\lambda_n$ for measurement.

In this case, it is only necessary to measure the spectroscopic wavelength $\lambda_1$ for measurement that is longer than the specific R wavelength $\lambda_R$ before the measurement of the specific R wavelength $\lambda_R$ in the forward scanning and to measure the spectroscopic wavelength $\lambda_i$ for measurement that is shorter than the specific R wavelength $\lambda_R$ after the measurement of the specific R wavelength $\lambda_R$ in the backward scanning. The same applies to the specific B wavelength $\lambda_B$, and for example, the specific B wavelength $\lambda_B$ may be shorter than the spectroscopic wavelength $\lambda_{\beta 1}$ for measurement and the spectroscopic wavelength $\lambda_{\beta 1+1}$ for measurement. In this case, it is only necessary to measure the spectroscopic wavelength $\lambda_1$ for measurement that is shorter than the specific B wavelength $\lambda_B$ after the measurement of the specific B wavelength $\lambda_B$ in the forward scanning and to measure the spectroscopic wavelength $\lambda_1$ for measurement that is longer than the specific B wavelength $\lambda_B$ before the measurement of the specific B wavelength $\lambda_B$ in the backward scanning.

The example in FIG. 3 is an example in which the measurement processing performed once is completed in the forward scanning performed once and the backward scanning performed once, it is determined that acquisition of all the spectroscopic images for measurement has been completed when the number of times the measurement is performed meets m=5+n before the spectroscopic image with the specific R wavelength $\lambda_R$ is captured in the backward scanning, and the analysis processing is performed by the spectroscopic measurement section 315 to update the analysis result.

According to the present embodiment as described above, it is possible to dramatically improve the frame rate of the color image to be displayed as a real time image.

For example, a case in which spectroscopic images for synthesis of RGB are captured after sixteen spectroscopic images for measurement are captured to synthesize a color image and update a real time image will be described as Comparative Example 1. The frame rate, which is an update frequency of the color image, in such Comparative Example 1 is a sum of a time related to acquisition of the sixteen spectroscopic images for measurement and a time related to acquisition of the three spectroscopic images for synthesis on the assumption that the time related to imaging of a spectroscopic image performed once is t, and the sum is 19t.

On the other hand, according to the present embodiment, eight spectroscopic images for measurement are imaged during the forward scanning, eight spectroscopic images for measurement are imaged during the backward scanning, and the frame rate is a sum of the time related to the eight spectroscopic images for measurement and the time related to the three spectroscopic images for synthesis, which is lit.

Advantageous Effects of Embodiment

The spectroscopic measurement apparatus 1 according to the present embodiment includes an interference filter 11, an imaging element 12 that captures image light transmitted through the interference filter 11, and a control section 30. The interference filter 11 is a spectroscopic filter that includes the first reflective film 113 and the second reflective film 114 forming the pair of reflective films and causes image light with a predetermined wavelength to be selectively emitted from the image light from the measurement target object X that is incident image light by changing a distance dimension of the gap D between the first reflective film 113 and the second reflective film 114. The control section 30 includes the processor 31 and the storage section 32 and functions as the filter control section 311, the image synthesis section 313, and the like by the processor 31 reading and executing programs stored in the storage section 32. The filter control section 311 controls the interference filter 11 to select the wavelength of the image light that is to be transmitted through the interference filter 11. Specifically, the filter control section 311 switches the wavelength of the image light that is to be transmitted through the interference filter 11 to the plurality of spectroscopic wavelengths for spectral measurement in each of the forward scanning of changing the distance between the gap D between the reflective films from the predetermined maximum dimension to the minimum dimension and the backward scanning of changing the distance from the minimum dimension to the maximum dimension. Further, the filter control section 311 switches the wavelength that is to be transmitted through the interference filter 11 to the predetermined specific R wavelength $\lambda_R$ belonging to the red color wavelength range, the predetermined specific G wavelength $\lambda_G$ belonging to the green color wavelength range, and the predetermined specific B wavelength $\lambda_B$ belonging to the blue wavelength range in each of the forward scanning and the backward scanning. The image synthesis section 313 synthesizes the spectroscopic images with the predetermined spectroscopic wavelengths obtained by the imaging element 12 capturing the image light to generate a synthesized image. Specifically, the image synthesis section 313 synthesizes a color image by synthesizing the spectroscopic images obtained by capturing each of the image light with the specific R wavelength $\lambda_R$, the specific G wavelength $\lambda_G$, and the specific B wavelength $\lambda_B$ obtained in the forward scanning performed once. Also, the image synthesis section 313 synthesizes a color image by synthesizing the spectroscopic images obtained by capturing each of the image light with the specific R wavelength $\lambda_R$, the specific G wavelength $\lambda_G$, and the specific B wavelength $\lambda_B$ obtained in the backward scanning performed once.

Thus, according to the present embodiment, it is possible to acquire the spectroscopic images with the specific R wavelength $\lambda_R$, the specific G wavelength $\lambda_G$, and the specific B wavelength $\lambda_B$ every time the forward scanning is performed and every time the backward scanning is performed and to generate a color image by synthesizing the spectroscopic images. It is thus possible to improve the frame rate when the color image to be displayed in real time is updated every time the forward scanning is performed and every time the backward scanning is performed.

In the present embodiment, the control section 30 also functions as the display control section 314 that outputs, to the display section, a color image generated by the image synthesis section 313, and the display control section 314 updates the color image to be output to the display section every time the color image is generated.

It is thus possible to cause the display section to display the color image generated by the image synthesis section every time the forward scanning is performed and every time the backward scanning is performed and to improve the frame rate, which is an update frequency of the color image, when the color image is displayed as a real time image.

Second Embodiment

Next, a second embodiment will be described.

In the aforementioned first embodiment, the spectroscopic images with the specific R wavelength $\lambda_R$, the specific G wavelength $\lambda_G$, and the specific B wavelength $\lambda_B$ are captured in the forward scanning, and the spectroscopic images with the specific R wavelength $\lambda_R$, the specific G wavelength $\lambda_G$, and the specific B wavelength $\lambda_B$ are also imaged in the backward scanning as well. On the other hand, the second embodiment is different from the aforementioned first embodiment in that the spectroscopic image with the specific G wavelength $\lambda_G$ and any one of the spectroscopic images with the specific R wavelength $\lambda_R$ and the specific B wavelength $\lambda_B$ are imaged during the forward scanning and during the backward scanning.

In the following description, the same reference signs will be applied to the configurations that have already been described, and description thereof will be omitted or simply provided.

Figure 5:
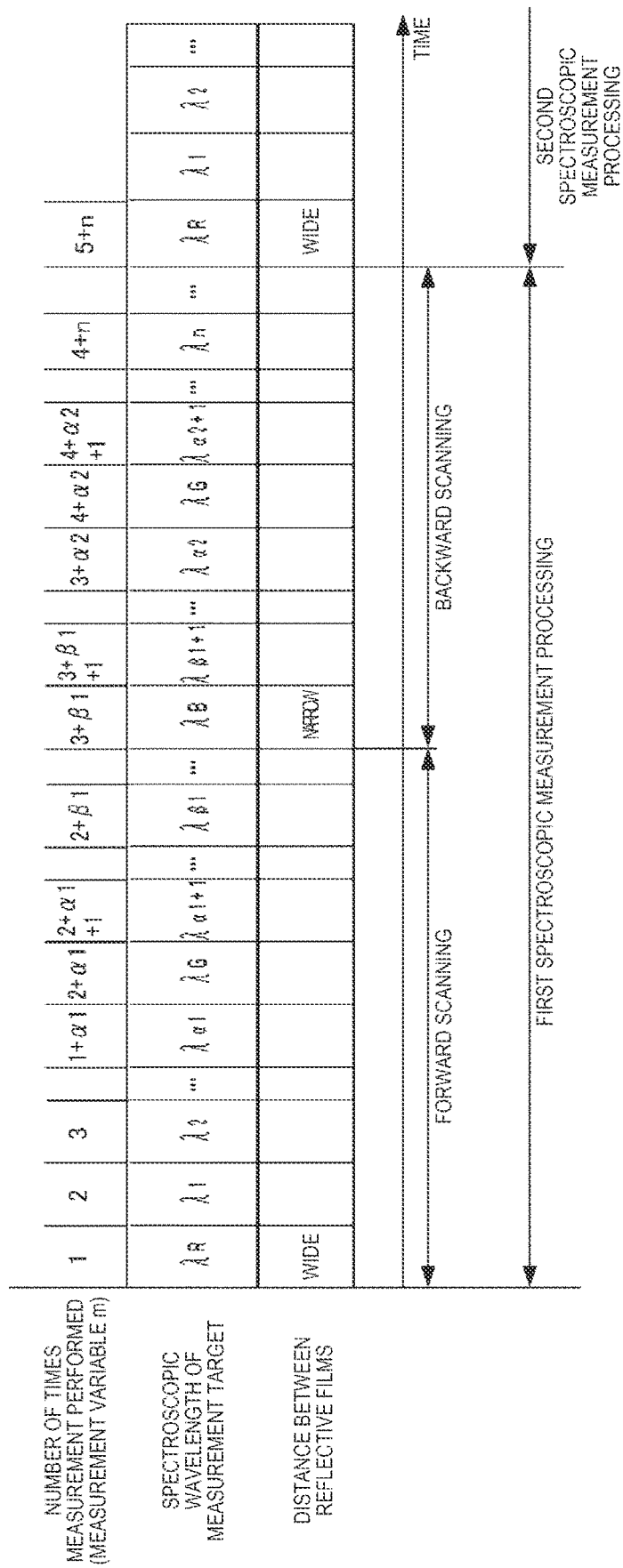
FIG. 5 is a diagram illustrating an example of an acquisition order of spectroscopic images for measurement and spectroscopic images for synthesis according to a second embodiment.

FIG. 5 is a diagram illustrating an example of an acquisition order of spectroscopic images for measurement and spectroscopic images for synthesis according to the present embodiment.

In the present embodiment, the specific R wavelength $\lambda_R$ and the specific G wavelength $\lambda_G$ are included as the spectroscopic wavelengths to be switched in the forward scanning in the spectroscopic measurement processing, and the specific B wavelength $\lambda_B$ and the specific G wavelength $\lambda_G$ are included as the spectroscopic wavelengths to be switched in the backward scanning as illustrated in FIG. 5. In other words, the spectroscopic image for synthesis with the specific B wavelength $\lambda_B$ is not acquired in the forward scanning, and the spectroscopic image for synthesis with the specific R wavelength $\lambda_R$ is not acquired in the backward scanning.

Thus, the image synthesis section 313 synthesizes the spectroscopic images for synthesis with the specific R wavelength $\lambda_R$ and the specific G wavelength $\lambda_G$ acquired in the forward scanning and the spectroscopic image for synthesis with the specific B wavelength $\lambda_B$ acquired in the backward scanning to generate a color image at a timing at which the spectroscopic image for synthesis with the specific B wavelength $\lambda_B$ is acquired in the backward scanning after the forward scanning. Also, the image synthesis section 313 synthesizes the spectroscopic images for synthesis with the specific B wavelength $\lambda_B$ and the specific G wavelength $\lambda_G$ acquired in the backward scanning and the spectroscopic image for synthesis with the specific R wavelength $\lambda_R$ acquired in the forward scanning to generate a color image at a timing at which the spectroscopic image for synthesis with the specific R wavelength $\lambda_R$ is acquired in the forward scanning after the backward scanning.

Advantageous Effect of Embodiment

The spectroscopic measurement apparatus 1 according to the present embodiment includes the interference filter 11, the imaging element 12 that captures the image light that has been transmitted through the interference filter 11, and the control section 30 similarly to the first embodiment. In the present embodiment, the filter control section 311 switches the wavelength that is to be transmitted through the spectroscopic filter to the specific G wavelength $\lambda_G$ in each of the forward scanning and the backward scanning and switches at least once the wavelength that is to be transmitted through the spectroscopic filter to the specific R wavelength $\lambda_R$ and the specific B wavelength $\lambda_B$ in either the forward scanning or the backward scanning. In other words, the spectroscopic images for synthesis with the specific R wavelength $\lambda_R$ and the specific G wavelength $\lambda_G$ are acquired in the forward scanning, and the spectroscopic images for synthesis with the specific G wavelength $\lambda_G$ and the specific B wavelength $\lambda_B$ are acquired in the backward scanning.

Then, the image synthesis section 313 synthesizes the spectroscopic images for synthesis with the specific R wavelength $\lambda_R$ and the specific G wavelength $\lambda_G$ obtained in the forward scanning and the spectroscopic image for synthesis with the specific B wavelength $\lambda_B$ obtained in the backward scanning following the forward scanning to generate a color image. Also, the image synthesis section 313 synthesizes the spectroscopic images for synthesis with the specific B wavelength $\lambda_B$ and the specific G wavelength $\lambda_G$ obtained in the backward scanning and the spectroscopic image for synthesis with the specific R wavelength $\lambda_R$ obtained in the forward scanning following the backward scanning to generate a color image.

In other words, the spectroscopic image in the blue color wavelength range is an image acquired when the distance between the reflective films is narrowed and can be acquired during a period immediately before the forward scanning is switched to the backward scanning and during a period immediately after the switching to the backward scanning. Thus, when the spectroscopic image with the specific B wavelength $\lambda_B$ is captured in the forward scanning, and the spectroscopic image with the specific B wavelength $\lambda_B$ is also captured in the backward scanning following the forward scanning as well, these spectroscopic images can be regarded as substantially the same. Thus, in the present embodiment, only any one of substantially the same images, that is, the spectroscopic image with the specific B wavelength $\lambda_B$ is acquired only in the forward scanning. The same applies to the specific R wavelength $\lambda_R$, and the spectroscopic image with the specific R wavelength $\lambda_R$ is acquired only in the backward scanning. It is thus possible to synthesize the color image using the image synthesis section 313 at substantially the same cycle as the cycle at which the forward scanning and the backward scanning are switched similarly to the first embodiment and to improve the frame rate.

Also, in the present embodiment, the number of acquired spectroscopic images for synthesis in the forward scanning and the backward scanning is less than that in the first embodiment only by one. It is thus possible to further shorten the synthesis timing of the color image and to further shorten the frame rate, which is the update frequency of the color image to be displayed as a real time image as compared with those in the first embodiment.

MODIFICATION EXAMPLES

The present disclosure is not limited to the aforementioned embodiments and configurations obtained through modifications, improvements, and appropriate combinations of the embodiments within a scope in which the object of the present disclosure can be achieved are included in the present disclosure.

Modification Example 1

Figure 6:
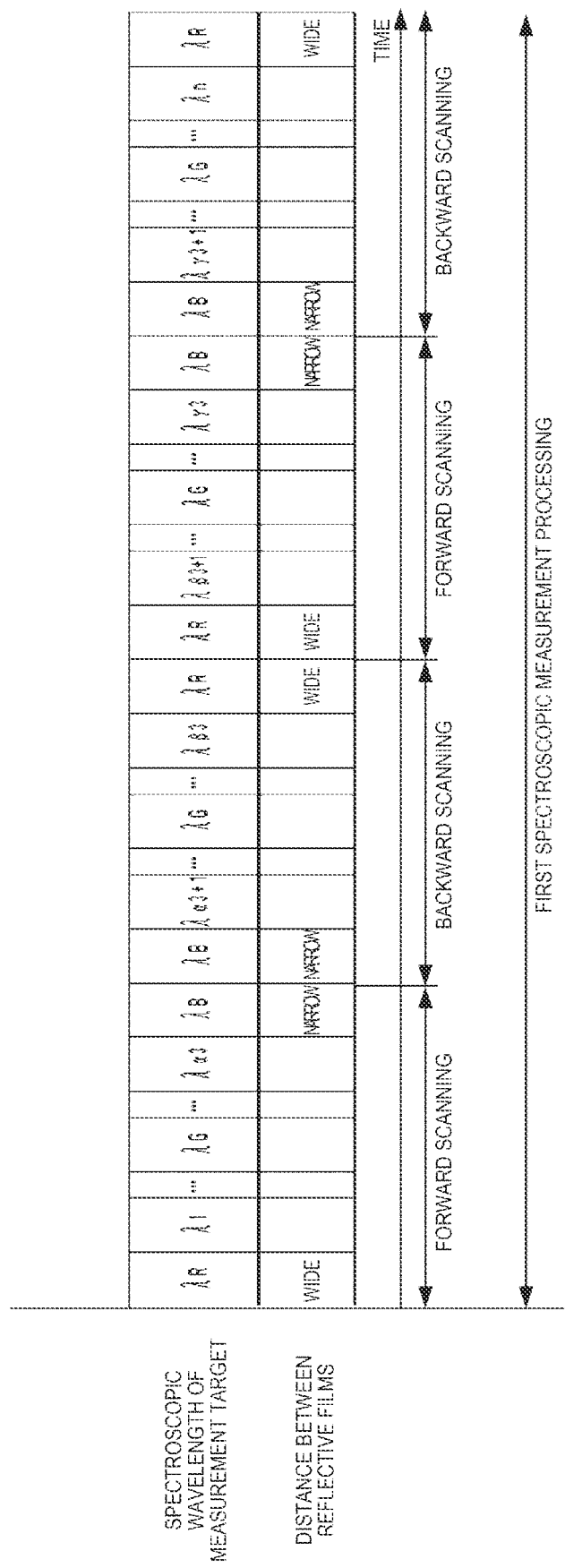
FIG. 6 is a diagram illustrating an example of an acquisition order of a spectroscopic image for measurement and a spectroscopic image for synthesis according to a Modification Example 1.

FIG. 6 is a diagram illustrating an example of an acquisition order of spectroscopic images for measurement and spectroscopic images for synthesis according to Modification Example 1.

In the aforementioned first and second embodiments, the filter control section 311 switches the wavelength of light that is to be transmitted through the interference filter 11 to the n spectroscopic wavelengths for spectral measurement and n spectroscopic images for measurement are acquired, when the forward scanning is performed once and the backward scanning is performed once. On the other hand, as illustrated in FIG. 6, the spectroscopic images for measurement with n spectroscopic wavelengths for spectral measurement may be acquired in the forward scanning and the backward scanning performed a plurality of times, namely twice or more. The example illustrated in FIG. 6 is an example in which the spectroscopic images for synthesis with the specific R wavelength $\lambda_R$, the specific G wavelength $\lambda_G$, and the specific B wavelength $\lambda_B$ for synthesizing a color image are acquired every time the forward scanning is performed and every time the backward scanning is performed as in the first embodiment. Instead, a color image may be synthesized using one of the spectroscopic images for synthesis with the specific R wavelength $\lambda_R$ and the specific B wavelength $\lambda_B$ obtained by scanning performed immediately before as in the second embodiment. In either case, it is possible to further improve the frame rate of the color image to be displayed as a real time image by the amount corresponding to a decrease in number of acquired spectroscopic images for measurement in the forward scanning and the backward scanning.

Modification Example 2

FIG. 7 is a diagram illustrating an example of an acquisition order of spectroscopic images for measurement and spectroscopic images for synthesis according to Modification Example 2.

As illustrated in FIG. 7, a spectroscopic wavelength for measurement of a spectroscopic image for measurement which belongs to the red color wavelength range may be used as the specific R wavelength, a spectroscopic wavelength for measurement of a spectroscopic image for measurement which belongs to the green color wavelength range may be used as the specific G wavelength, and a spectroscopic wavelength for measurement of a spectroscopic image for measurement which belongs to the blue color wavelength range may be used as the specific B wavelength.

In this case, it is possible to reduce the number of acquired spectroscopic images in the spectroscopic measurement processing performed once only by three as compared with the first embodiment, and corresponding to the decrease in number, it is possible to improve the frame rate of the color image to be displayed as a real time image and the frame rate of the analysis result image based on the spectroscopic images for measurement.

Modification Example 3

Although in the aforementioned embodiments, the color image is displayed as a real time image and then the processing of displaying the analysis result image of the component analysis processing based on the spectroscopic images for measurement on the color image is performed, the present disclosure is not limited thereto. For example, a spectroscopic image for measurement with a predetermined spectroscopic wavelength for measurement may be displayed in a display region that is different from that of the color image. Alternatively, a synthesized image obtained by synthesizing spectroscopic images with predetermined spectroscopic wavelengths for measurement selected by the user from among the spectroscopic images for measurement may be displayed in a superimposed manner on the color image or may be displayed in a different region.

Modification Example 4

Although in the second embodiment, the spectroscopic measurement apparatus 1 acquires the spectroscopic images for synthesis with the specific G wavelength $\lambda_G$ and the specific R wavelength $\lambda_R$ without acquiring the spectroscopic image for synthesis with the specific B wavelength $\lambda_B$ in the backward scanning and acquires the spectroscopic images for synthesis with the specific G wavelength $\lambda_G$ and the specific B wavelength $\lambda_B$ without acquiring the spectroscopic image for synthesis with the specific R wavelength $\lambda_R$ in the second and following forward scanning, the present disclosure is not limited thereto.

For example, the spectroscopic measurement apparatus 1 may acquire the spectroscopic images for synthesis with the specific B wavelength $\lambda_B$ and the specific G wavelength $\lambda_G$ without acquiring the spectroscopic image for synthesis with the specific R wavelength $\lambda_R$ in the backward scanning and may acquire the spectroscopic images for synthesis with the specific R wavelength $\lambda_R$ and the specific G wavelength $\lambda_G$ without acquiring the spectroscopic image for synthesis with the specific B wavelength $\lambda_B$ in the second and following forward scanning. In this case, it is only necessary for the image synthesis section 313 to synthesize the spectroscopic images for synthesis with the specific B wavelength $\lambda_B$ and the specific G wavelength $\lambda_G$ obtained in the backward scanning and the spectroscopic image for synthesis with the specific R wavelength $\lambda_R$ obtained in an early stage in the forward scanning to generate a color image at a timing at which the spectroscopic image for synthesis with the specific R wavelength is acquired in the forward scanning after the backward scanning. Similarly, the image synthesis section 313 may synthesize the spectroscopic images for synthesis with the specific R wavelength $\lambda_R$ and the specific G wavelength $\lambda_G$ obtained in the forward scanning and the spectroscopic image for synthesis with the specific B wavelength $\lambda_B$ to generate a color image at a timing at which the spectroscopic image for synthesis with the specific B wavelength obtained in the following backward scanning after the forward scanning is acquired.

In other words, the filter control section 311 may switch the spectroscopic wavelength that is to be transmitted through the interference filter 11 in each of the forward scanning and the backward scanning to a plurality of spectroscopic wavelengths for spectral measurement, switch the spectroscopic wavelength to the specific G wavelength $\lambda_G$ in each of the forward scanning and the backward scanning, and switch at least once the spectroscopic wavelength to the specific R wavelength $\lambda_R$ and the specific B wavelength $\lambda_B$ between the forward scanning and the backward scanning.

In this manner, the image synthesis section 313 generates a color image by synthesizing the spectroscopic images for synthesis with the specific R wavelength $\lambda_R$ and the specific B wavelength $\lambda_B$ obtained in the forward scanning performed once or the backward scanning that is continuous with the forward scanning and the spectroscopic image for synthesis with the specific G wavelength $\lambda_G$ obtained in the forward scanning. Moreover, the image synthesis section 313 generates a color image by synthesizing the spectroscopic images for synthesis with the specific R wavelength $\lambda_R$ and the specific B wavelength $\lambda_B$ obtained in the backward scanning performed once or the forward scanning that is continuous with the backward scanning and the spectroscopic image for synthesis with the specific G wavelength $\lambda_G$ obtained in the backward scanning.

Other Modification Examples

Although the configuration in which the interference filter 11 includes the electrostatic actuator 117 that causes the gap dimension between the reflective films 113 and 114 to vary in response to application of a voltage has been employed in each of the aforementioned embodiments, the present disclosure is not limited thereto. For example, a configuration in which a first induction coil is disposed instead of the first electrode 115 and an induction actuator with a second induction coil or a permanent magnet disposed therein instead of the second electrode 116 is used may be employed. Also, a configuration in which a piezoelectric actuator is used instead of the electrostatic actuator 117 may be employed.

Although the interference filter 11 adapted such that the first substrate 111 and the second substrate 112 are joined to each other in a mutually facing state, the first substrate 111 is provided with the first reflective film 113, and the second substrate 112 is provided with the second reflective film 114 has been described as an example of Fabry-Perot etalon in each of the aforementioned embodiments, the present disclosure is not limited thereto.

For example, an interference filter in which two reflective films are laminated on one substrate via a sacrificial layer and a gap is formed by removing the sacrificial layer through etching or the like may be used.

In addition, specific structures employed when the present disclosure is implemented may be configured by appropriately combining each of the aforementioned embodiments and modification examples or may be changed to other structures or the like within a scope in which the object of the present disclosure can be achieved.

Overview of the Disclosure

An image generation apparatus according to a first aspect of the present disclosure includes: a spectroscopic filter that includes a pair of reflective films and causes image light with a predetermined wavelength to be selectively emitted from incident image light by changing a distance between the pair of reflective films; an imaging element that captures the image light that is transmitted through the spectroscopic filter; a filter control section that controls the spectroscopic filter to select a wavelength of the image light that is to be transmitted through the spectroscopic filter; and an image synthesis section that synthesizes the spectroscopic image with the predetermined wavelength obtained through imaging of the image light using the imaging element to generate a synthesized image, in which the filter control section switches the wavelength of the image light that is to be transmitted through the spectroscopic filter to a plurality of wavelengths for spectral measurement in each of forward scanning in which the distance between the pair of reflective films is changed from a predetermined maximum dimension to a minimum dimension and backward scanning in which the distance is changed from the minimum dimension to the maximum dimension, and switches the wavelength that is transmitted through the spectroscopic filter to a predetermined red color wavelength belonging to a red color wavelength range, a predetermined green color wavelength belonging to a green color wavelength range, and a predetermined blue color wavelength belonging to a blue color wavelength range in each of the forward scanning and the backward scanning, and the image synthesis section generates a color image by synthesizing spectroscopic images obtained by imaging the image light with each of the red color wavelength, the green color wavelength, and the blue color wavelength obtained in the forward scanning performed once, and generates a color image by synthesizing spectroscopic images obtained by imaging the image light with each of the red color wavelength, the green color wavelength, and the blue color wavelength obtained in the backward scanning performed once.

With such a configuration, it is possible to acquire the spectroscopic images that are captured images obtained by imaging image light with a red color wavelength, a green color wavelength, and a blue color wavelength every time forward scanning is performed and every time backward scanning is performed, and to generate a color image by synthesizing these spectroscopic images. Therefore, it is possible to update the color image to be displayed in real time every time the forward scanning is performed and every time the backward scanning is performed and to improve a frame rate.

An image generation apparatus according to a second aspect of the present disclosure includes: a spectroscopic filter that includes a pair of reflective films and causes image light with a predetermined wavelength to be selectively emitted from incident image light by changing a distance between the pair of reflective films; an imaging element that captures the image light that is transmitted through the spectroscopic filter; a filter control section that controls the spectroscopic filter to select a wavelength of the image light that is to be transmitted through the spectroscopic filter; and an image synthesis section that synthesizes a spectroscopic image with a predetermined wavelength obtained through imaging of the image light using the imaging element to generate a color image, in which the filter control section switches the wavelength of the image light that is to be transmitted through the spectroscopic filter to a plurality of wavelengths for spectral measurement in each of forward scanning in which the distance between the pair of reflective films is changed from a predetermined maximum dimension to a minimum dimension and backward scanning in which the distance is changed from the minimum dimension to the maximum dimension, switches the wavelength that is to be transmitted through the spectroscopic filter to a predetermined green color wavelength belonging to a green color wavelength range in each of the forward scanning and the backward scanning, and switches at least once the wavelength that is to be transmitted through the spectroscopic filter to a predetermined red color wavelength belonging to a red color wavelength range and a predetermined blue color wavelength belonging to a blue color wavelength range through either the forward scanning or the backward scanning, and the image synthesis section generates a color image by synthesizing a spectroscopic image obtained by imaging the image light with the green color wavelength obtained in the forward scanning and a spectroscopic image obtained by imaging the image light with each of the red color wavelength and the blue color wavelength obtained in the forward scanning or the backward scanning that is continuous with the forward scanning, and generates a color image by synthesizing a spectroscopic image obtained by imaging the image light with the green color wavelength obtained in the backward scanning and a spectroscopic image obtained by imaging the image light with each of the red color wavelength and the blue color wavelength obtained in the backward scanning or the forward scanning that is continuous with the backward scanning.

The spectroscopic image in the blue color wavelength range is an image acquired when the distance between the reflective films is narrowed and can be acquired during a period immediately before the forward scanning is switched to the backward scanning and a period immediately after switching to the backward scanning. Therefore, when the spectroscopic image with the blue color wavelength is acquired in the forward scanning, and the spectroscopic image with the blue color wavelength is acquired in the backward scanning following the forward scanning as in the first aspect, the acquisition period therebetween is significantly short, and the images can be regarded as substantially the same images. In the second aspect, only any one of these substantially the same images is acquired.

The same applies to the spectroscopic image with a red color wavelength in the red color wavelength range. In other words, the spectroscopic image with the red color wavelength can be acquired in a period immediately before the backward scanning is switched to the forward scanning and a period immediately after switching to the forward scanning. Therefore, when the spectroscopic image with the red color wavelength is acquired in the backward scanning, and the spectroscopic image with the red color wavelength is acquired in the forward scanning following the backward scanning as in the first aspect, the acquisition interval therebetween is significantly short, and the images can be regarded as substantially the same images. In the second aspect, only any one of these substantially the same images is acquired.

In such a second aspect, it is possible to synthesize the color image using the image synthesis section at substantially the same cycle as the cycle at which the forward scanning and the backward scanning are switched and to improve the frame rate similarly to the first aspect. Also, it is possible to reduce the number of acquired spectroscopic images with the red color wavelength and the spectroscopic images with the blue color wavelength as compared with the first aspect and thereby to further improve the frame rate.

The image generation apparatus according to the first and second aspects further includes a display control section that outputs the color image generated by the image synthesis section to the display section, and the display control section updates the color image to be output to the display section every time the color image is generated.

It is thus possible to cause the display section to display the color image generated by the image synthesis section every time the forward scanning is performed and every time the backward scanning is performed and to improve the frame rate, which is an update frequency of the color image, when the color image is displayed as a real time image.

An image generation method according to a third aspect of the present disclosure is performed by an image generation apparatus including a spectroscopic filter that includes a pair of reflective films and causes image light with a predetermined wavelength to be selectively emitted from incident image light by changing a distance between the pair of reflective films and an imaging element that captures the image light that is transmitted through the spectroscopic filter. The method includes: obtaining a captured image by capturing the image light with each wavelength by switching a wavelength of the image light that is to be transmitted through the spectroscopic filter to a plurality of wavelengths for spectral measurement in each of forward scanning in which the distance between the pair of reflective films is changed from a predetermined maximum dimension to a minimum dimension and backward scanning in which the distance is changed from the minimum dimension to the maximum dimension, and switching the wavelength that is to be transmitted through the spectroscopic filter to a predetermined red color wavelength belonging to a red color wavelength range, a predetermined green color wavelength belonging to a green color wavelength range, and a predetermined blue color wavelength belonging to a blue color wavelength range in each of the forward scanning and the backward scanning; and generating a color image by synthesizing spectroscopic images obtained by imaging the image light with each of the red color wavelength, the green color wavelength, and the blue color wavelength obtained in the forward scanning performed once, and generating a color image by synthesizing spectroscopic images obtained by imaging the image light with each of the red color wavelength, the green color wavelength, and the blue color wavelength obtained in the backward scanning performed once.

It is thus possible to acquire the spectroscopic images that are captured images obtained by imaging image light of the red color wavelength, the green color wavelength, and the blue color wavelength every time forward scanning is performed and every time backward scanning is performed and to generate a color image by synthesizing the spectroscopic images similarly to the first aspect. Therefore, it is possible to update the color image to be displayed in real time every time the forward scanning is performed and every time the backward scanning is performed and to improve a frame rate.

An image generation method according to a fourth aspect of the present disclosure is performed by an image generation apparatus including a spectroscopic filter that includes a pair of reflective films and causes image light with a predetermined wavelength to be selectively emitted from incident image light by changing a distance between the pair of reflective films and an imaging element that captures the image light that is transmitted through the spectroscopic filter. The method includes: obtaining a captured image by capturing the image light with each wavelength by switching a wavelength of the image light that is to be transmitted through the spectroscopic filter to a plurality of wavelengths for spectral measurement in each of forward scanning in which the distance between the pair of reflective films is changed from a predetermined maximum dimension to a minimum dimension and backward scanning in which the distance is changed from the minimum dimension to the maximum dimension, switching the wavelength that is to be transmitted through the spectroscopic filter to a predetermined green color wavelength belonging to a green color wavelength range in each of the forward scanning and the backward scanning, and switching at least once the wavelength that is to be transmitted through the spectroscopic filter to a predetermined red color wavelength belonging to a red color wavelength range and a predetermined blue color wavelength belonging to a blue color wavelength range through either the forward scanning or the backward scanning, and generating a color image by synthesizing a spectroscopic image obtained by imaging the image light with the green color wavelength obtained in the forward scanning and a spectroscopic image obtained by imaging the image light with each of the red color wavelength and the blue color wavelength obtained in the forward scanning or the backward scanning that is continuous with the forward scanning, and generating a color image by synthesizing a spectroscopic image obtained by imaging the image light with the green color wavelength obtained in the backward scanning and a spectroscopic image obtained by imaging the image light with each of the red color wavelength and the blue color wavelength obtained in the backward scanning or the forward scanning that is continuous with the backward scanning.

It is thus possible to synthesis a color image using the image synthesis section at substantially the same cycle as the cycle at which the forward scanning and the backward scanning are switched and to improve the frame rate similarly to the first to third aspects. Moreover, it is possible to reduce the number of acquired spectroscopic images with the red color wavelength and the spectroscopic images with the blue color wavelength as compared with the first to third aspects and thereby to further improve the frame rate.

What is claimed is:

1. An image generation apparatus comprising:
a spectroscopic filter that includes a pair of reflective films and causes image light with a predetermined wavelength to be selectively emitted from incident image light by changing a distance between the pair of reflective films;
an imaging element that captures the image light that is transmitted through the spectroscopic filter; and
one or more processors, wherein
the one or more processors are configured to execute:
switching a wavelength of the image light that is to be transmitted through the spectroscopic filter to a plurality of wavelengths for spectral measurement in each of forward scanning in which the distance between the pair of reflective films is changed from a predetermined maximum dimension to a predetermined minimum dimension and backward scanning in which the distance is changed from the predetermined minimum dimension to the predetermined maximum dimension, and switching the wavelength that is transmitted through the spectroscopic filter to a predetermined red color wavelength belonging to a red color wavelength range, a predetermined green color wavelength belonging to a green color wavelength range, and a predetermined blue color wavelength belonging to a blue color wavelength range in each of the forward scanning and the backward scanning, and
generating a color image by synthesizing spectroscopic images obtained by imaging the image light with each of the predetermined red color wavelength, the predetermined green color wavelength, and the predetermined blue color wavelength obtained in the forward scanning performed once, and generating a color image by synthesizing spectroscopic images obtained by imaging the image light with each of the predetermined red color wavelength, the predetermined green color wavelength, and the predetermined blue color wavelength obtained in the backward scanning performed once.

2. An image generation apparatus, comprising:
a spectroscopic filter that includes a pair of reflective films and causes image light with a predetermined wavelength to be selectively emitted from incident image light by changing a distance between the pair of reflective films;
an imaging element that captures the image light that is transmitted through the spectroscopic filter; and
one or more processors, wherein the one or more processors are configured to execute:
switching a wavelength of the image light that is to be transmitted through the spectroscopic filter to a plurality of wavelengths for spectral measurement in each of forward scanning in which the distance between the pair of reflective films is changed from a predetermined maximum dimension to a predetermined minimum dimension and backward scanning in which the distance is changed from the predetermined minimum dimension to the predetermined maximum dimension, switching the wavelength that is to be transmitted through the spectroscopic filter to a predetermined green color wavelength belonging to a green color wavelength range in each of the forward scanning and the backward scanning, and switching at least once of the wavelength that is to be transmitted through the spectroscopic filter to a predetermined red color wavelength belonging to a red color wavelength range and a predetermined blue color wavelength belonging to a blue color wavelength range through either the forward scanning or the backward scanning, and
generating a color image by synthesizing a spectroscopic image obtained by imaging the image light with the predetermined green color wavelength obtained in the forward scanning and a spectroscopic image obtained by imaging the image light with each of the predetermined red color wavelength and the predetermined blue color wavelength obtained in the forward scanning or the backward scanning that is continuous with the forward scanning, and generating a color image by synthesizing a spectroscopic image obtained by imaging the image light with the predetermined green color wavelength obtained in the backward scanning and a spectroscopic image obtained by imaging the image light with each of the predetermined red color wavelength and the predetermined blue color wavelength obtained in the backward scanning or the forward scanning that is continuous with the backward scanning.

3. The image generation apparatus according to claim 1, wherein
the one or more processors are configured to further execute
outputting the generated color image to a display section; and
updating the color image to be output to the display section every time the color image is generated.

4. An image generation method performed by an image generation apparatus including a spectroscopic filter that includes a pair of reflective films and causes image light with a predetermined wavelength to be selectively emitted from incident image light by changing a distance between the pair of reflective films and an imaging element that captures the image light that is transmitted through the spectroscopic filter, the method comprising:
obtaining a captured image by capturing the image light with each wavelength by switching a wavelength of the image light that is to be transmitted through the spectroscopic filter to a plurality of wavelengths for spectral measurement in each of forward scanning in which the distance between the pair of reflective films is changed from a predetermined maximum dimension to a predetermined minimum dimension and backward scanning in which the distance is changed from the predetermined minimum dimension to the predetermined maximum dimension, and switching the wavelength that is to be transmitted through the spectroscopic filter to a predetermined red color wavelength belonging to a red color wavelength range, a predetermined green color wavelength belonging to a green color wavelength range, and a predetermined blue color wavelength belonging to a blue color wavelength range in each of the forward scanning and the backward scanning; and
generating a color image by synthesizing spectroscopic images obtained by imaging the image light with each of the predetermined red color wavelength, the predetermined green color wavelength, and the predetermined blue color wavelength obtained in the forward scanning performed once, and generating a color image by synthesizing spectroscopic images obtained by imaging the image light with each of the predetermined red color wavelength, the predetermined green color wavelength, and the predetermined blue color wavelength obtained in the backward scanning performed once.

5. An image generation method performed by an image generation apparatus including a spectroscopic filter that includes a pair of reflective films and causes image light with a predetermined wavelength to be selectively emitted from incident image light by changing a distance between the pair of reflective films and an imaging element that captures the image light that is transmitted through the spectroscopic filter, the method comprising:

obtaining a captured image by capturing the image light with each wavelength by switching a wavelength of the image light that is to be transmitted through the spectroscopic filter to a plurality of wavelengths for spectral measurement in each of forward scanning in which the distance between the pair of reflective films is changed from a predetermined maximum dimension to a predetermined minimum dimension and backward scanning in which the distance is changed from the predetermined minimum dimension to the predetermined maximum dimension, switching the wavelength that is to be transmitted through the spectroscopic filter to a predetermined green color wavelength belonging to a green color wavelength range in each of the forward scanning and the backward scanning, and switching at least once the wavelength that is to be transmitted through the spectroscopic filter to a predetermined red color wavelength belonging to a red color wavelength range and a predetermined blue color wavelength belonging to a blue color wavelength range through either the forward scanning or the backward scanning; and generating a color image by synthesizing a spectroscopic image obtained by imaging the image light with the predetermined green color wavelength obtained in the forward scanning and a spectroscopic image obtained by imaging the image light with each of the predetermined red color wavelength and the predetermined blue color wavelength obtained in the forward scanning or the backward scanning that is continuous with the forward scanning, and generating a color image by synthesizing a spectroscopic image obtained by imaging the image light with the predetermined green color wavelength obtained in the backward scanning and a spectroscopic image obtained by imaging the image light with each of the predetermined red color wavelength and the predetermined blue color wavelength obtained in the backward scanning or the forward scanning that is continuous with the backward scanning.

* * * * *